United States Patent [19]
Andree et al.

[11] Patent Number: 4,573,811
[45] Date of Patent: Mar. 4, 1986

[54] CENTER-FREE LARGE ROLLING BEARING

[75] Inventors: Dietrich Andree; Walter Creutz, both of Dortmund, Fed. Rep. of Germany

[73] Assignee: Hoesch Aktiengesellschaft, Dortmund, Fed. Rep. of Germany

[21] Appl. No.: 719,360

[22] Filed: Apr. 3, 1985

[30] Foreign Application Priority Data

Apr. 7, 1984 [DE] Fed. Rep. of Germany ....... 3413286

[51] Int. Cl.$^4$ ............................................. F16C 19/30
[52] U.S. Cl. .................................................. 384/622
[58] Field of Search .............. 384/622, 621, 615, 617, 384/618

[56] References Cited

U.S. PATENT DOCUMENTS

| 3,765,254 | 10/1973 | Schluter et al. | 384/615 |
| 4,248,488 | 2/1981 | Sable | 384/622 |
| 4,368,932 | 1/1983 | Wolzenburg | 384/622 |
| 4,400,042 | 8/1983 | Fritz | 384/615 |

Primary Examiner—Lenard A. Footland
Attorney, Agent, or Firm—McCormick, Paulding & Huber

[57] ABSTRACT

To provide a center-free large rolling bearing in which firstly the ready standby bearing is not subjected to the full operating load during operation of the first bearing and secondly after failure of the first bearing the standby bearing can be used in simple and economic manner, in a center-free large rolling bearing in double constructional form having three bearing races (1, 2, 3), two of which are rotatable independently of each other and with respect to the third, and arranged therebetween rolling element rows (4, 5, 6, 7, 8, 9) for rotational connection of two components (11, 13), a center race (1) being fixedly connectable to a first component (11) and an outer race (2) or an inner race (3) fixedly connectable to a second component (13), it is proposed that the center race (1) consists of a plurality of sub-races (15, 16), that the outer race (2) connected to the second component (13) likewise consists of a plurality of sub-races (20, 21) and a parting line (22) of said outer race is disposed substantially at the same level as the rolling element row (4), bearing the supported load, of said outer race, and that the inner race (3) not connected to the second component (13) has a spacing (18) from the component (13) which is less than the height (19) of the rolling element row (4), bearing the supported load, of the connected outer race (2).

7 Claims, 8 Drawing Figures

CENTER-FREE LARGE ROLLING BEARING

The invention relates to a centre-free large rolling bearing in double constructional form having three bearing races, two of which are rotatable independently of each other and with respect to the third, and arranged therebetween rolling element rows for rotational connection of two components, a centre race being fixedly connectable to a first component and an outer race or an inner race being fixedly connectable to a second component.

Components connected together rotationally should in special cases even after failure of the rolling bearing means connecting them be able to fulfil their function for a further period of time. It may also happen that no replacement of the rolling bearing means can or is to be made.

For this purpose centre-free large rolling bearings in double constructional form having three bearing races and rolling element rows disposed therebetween are used. As a result, after failure of one complete bearing means a second complete bearing means is available already installed and can take over the full bearing function (e.g. DD patent 57,247 and DE publication print 2,634,776). Disadvantageous in DD patent 57,247 ist that the second available complete bearing means is subjected to the full load during operation of the first bearing means as well and can thereby itself already be damaged. DE publication print 2,634,776 provides that by underlaying a multi-part support ring always only one rolling bearing means is loaded and the second rolling bearing means remains unloaded. A disadvantage with this construction is in particular the use of additional components, making the conversion complicated and the bearing more expensive.

The invention is based on the problem of providing a centre-free large rolling bearing in which firstly the ready standby bearing is not subjected to the full operating load during operation of the first bearing and secondly after failure of the first bearing the standby bearing can be used in simple and economic manner.

This problem is solved according to the invention in a large rolling bearing of the type described in detail at the beginning in that the centre race consists of a plurality of sub-races, that the outer race connected to the second component likewise consists of a plurality of sub-races and a parting line of said outer race is disposed substantially at the same level as the rolling element row, bearing the supported load, of said outer race, and that the inner race not connected to the second component has a spacing from the component which is less than the height of the rolling element row, bearing the supported load, of the connected outer race.

It is however also possible with an integrally formed centre race that the inner race and the outer race are formed by a plurality of sub-races and a parting line of the outer race connected to the second component is disposed substantially at the same level as the rolling element row, bearing the supported load, of said outer race, and that the inner race not connected to the second component has a spacing from the component which is less than the height of the rolling element row, bearing the supported load, of the connected outer race.

The large rolling bearing according to the invention is further distinguished advantageously in that after wear of at least one rolling element row between the centre race and the outer race fixedly connected to the second component the rolling element row, bearing the supported load, after loosening and removal of the sub-race disposed at the level of said rolling bearing row is removed and that the second component after lowering onto the hitherto not fixedly connected inner race is connected fixedly to the latter.

In another further development of the invention idea it is also possible that instead of an outer race at first an inner race is connected to the second component and comprises the parting line.

The centre-free large rolling bearing according to the invention can advantageously be connected with the simplest means without additional components to the adjoining structure. The second rolling bearing system is not loaded before failure of the first rolling bearing system. Furthermore, the bearing is statically better connected to the adjoining structure, due to the full-area engagement of the joint faces between bearing and first and second component respectively. The conversion can be carried out in simple manner because no spacers need be positioned and fixed in the correct position. Advantageously, the second component need only be lowered onto the second rolling bearing system and there comes into full-area engagement. A complete pre-assembly of the second bearing system is also possible. As a result, in advantageous manner it is not necessary to keep conversion parts for years ready for any necessary conversion.

Examples of embodiment of the invention are illustrated schematically in the drawings and will be explained in detail hereinafter. In the drawings.

The large rolling bearings illustrated in double constructional form consist of three bearing races, that is the centre race 1, outer race 2 and inner race 3. The double bearing is constructed as double three-row roller bearing. Between the bearing races support roller rows 4, 7 taking up the axial forces and holding roller rows 5, 8 are disposed as well as radial roller rows 6, 9 transmitting the radial forces.

Figure 1:
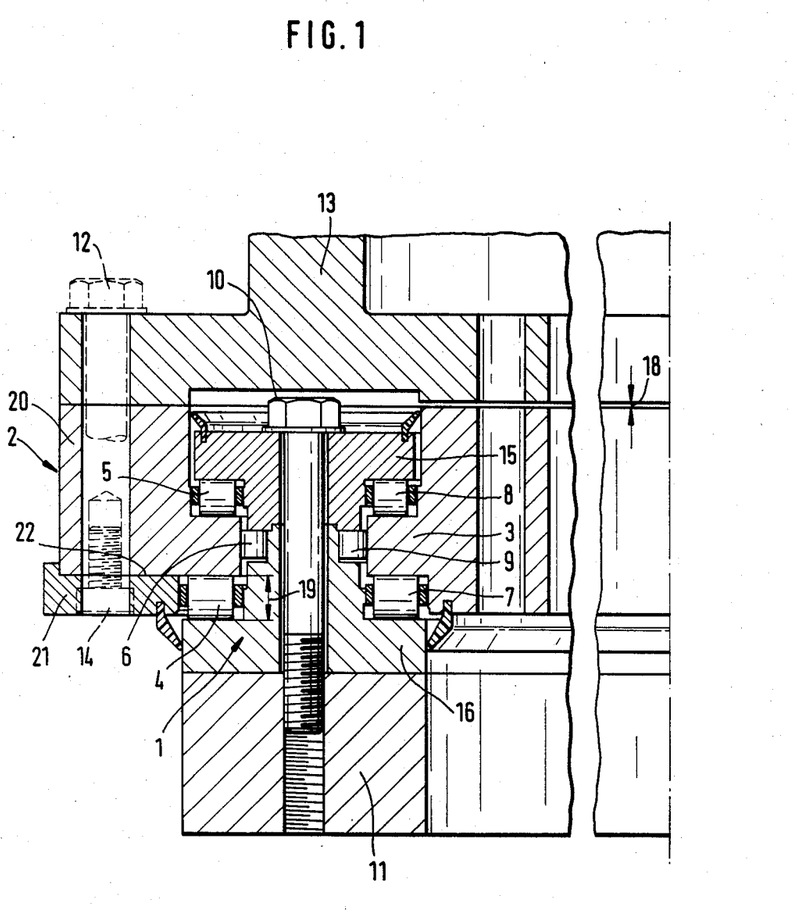
FIG. 1 is a section through a large rolling bearing having a divided centre race in which the second component originally rests on the outer race.

The bearing illustrated in FIG. 1 is secured with its centre race 1 via securing screws 10 to a first component 11 and with its outer race 2 via further connecting screws 12 to a second component 13 and connects these two components rotationally.

After wear of one or more rolling element rows 4, 5, 6 between the centre race 1 and outer race 2 provision is made for the previously unloaded rolling element rows 7, 8, 9 on the reserve races to be loaded and the rotation function to be taken over by them. For this reason, in the example of embodiment the holding screws 14, disposed offset with respect to the connecting screws 12, of the outer race 2 divided for this purpose substantially at the level of the roller row 4 carrying the supported load by a parting line 22 are loosened so that the sub-race 21 can shift downwardly with respect to the sub-race 20.

Figure 2:
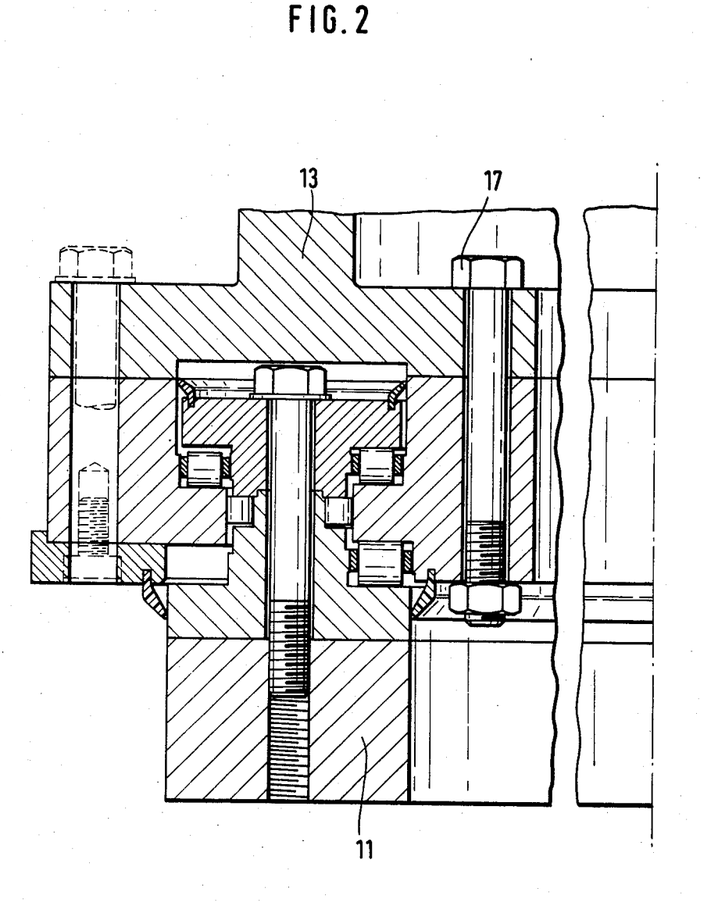
FIG. 2 shows the large rolling bearing according to FIG. 1 after starting operation of the reserve races.

Through the resulting opening of the outer race 2 after lifting the second component 13 the roller row 4 bearing the supported load can be removed radially. After removal of this support roller row 4 the second component 13 is lowered up to the inner race 3 and then connected to the latter via screws 17 (FIG. 2). The sub-race 21 can then be connected to the sub-race 20 again with the aid of the holding screws 14.

Figure 3:
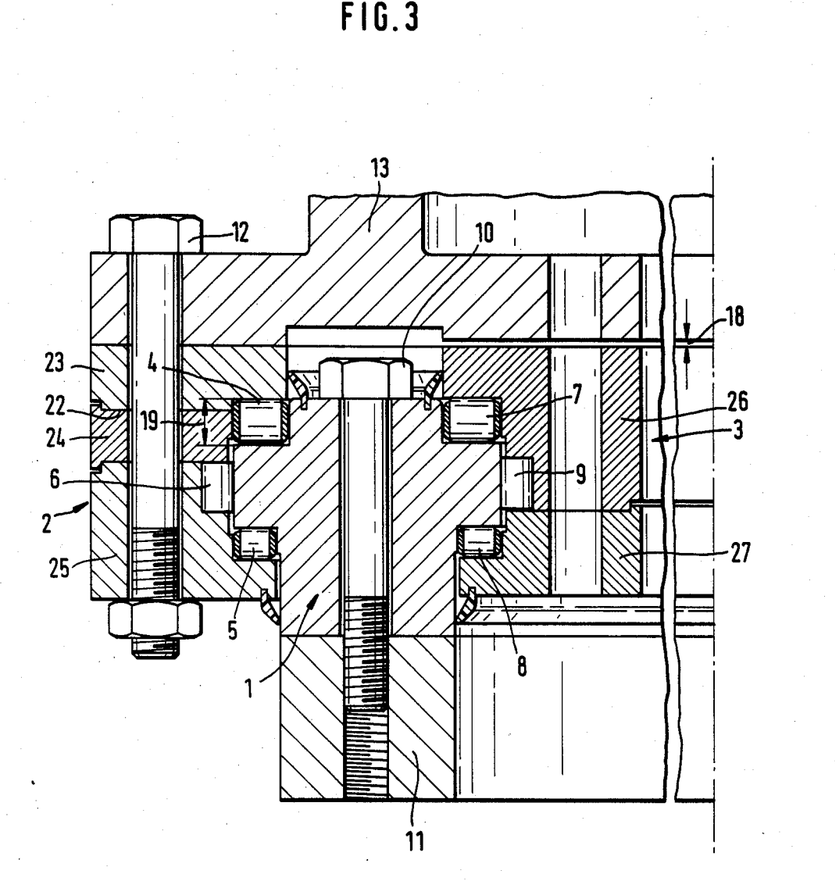
FIG. 3 shows a large rolling bearing with divided inner and outer races in which the second component originally bears on the outer race.
Figure 4:
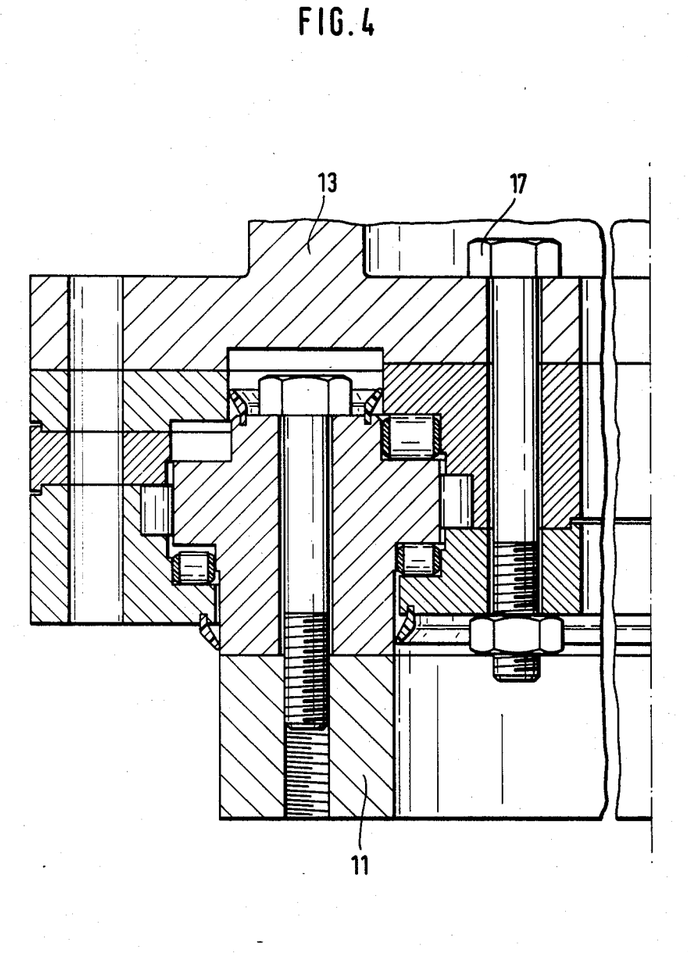
FIG. 4 shows a large rolling bearing corresponding to FIG. 3 after starting operation of the reserve races.

FIG. 3 shows a bearing according to the invention with an undivided centre race 1 and divided outer race 2 and inner race 3. The inner race 3 consists of two sub-races 26, 27 and the outer race 2 consists of three sub-races 23, 24, 25. The parting line 22 is disposed substantially at the level of the roller row 4 bearing the supported load. After wear of the first rolling bearing system, consisting of the roller rows 4, 5, 6, the connecting screws 12 are loosened so that by lowering the sub-races 24, 25 and raising the second component 13 the roller row 4 bearing the supported load can be removed radially through the resulting opening defined at the top by the parting line 22. Thereafter, the second component 13 is lowered onto the inner race 3 and after tightening of the screws 17 the hitherto unloaded bearing system can take over the bearing function with the roller rows 7, 8, 9 (FIG. 4). It is also possible with this constructional form apart from the roller rows 4 bearing the supported load to remove also the radial roller row 6 of the first bearing system. On appropriate further lowering of the sub-race 25 the holding roller row 5 can also be removed.

Figure 5:
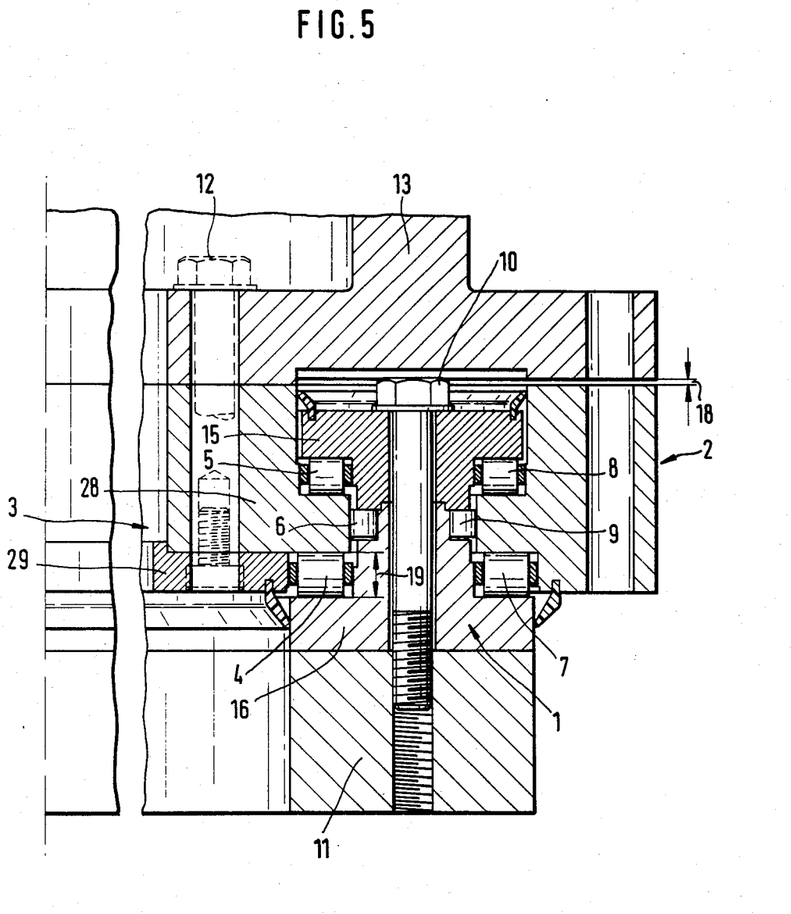
FIG. 5 shows a large rolling bearing corresponding to FIG. 1 in which however the second component originally bears on an inner race.
Figure 6:
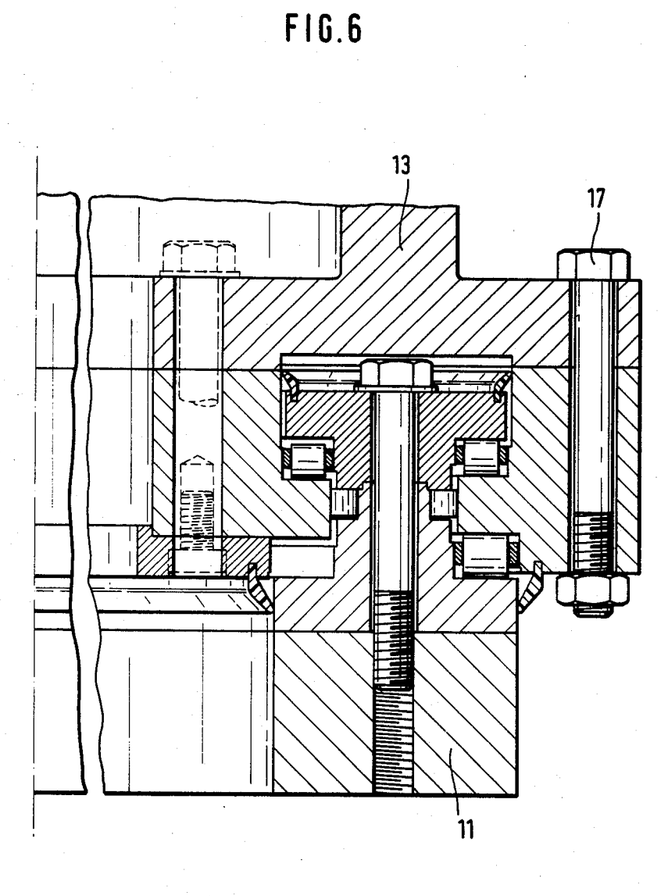
FIG. 6 shows a large rolling bearing according to FIG. 5 after starting operation of the reserve races and FIG. 7 shows a large rolling bearing corresponding to FIG. 3 having an outer race consisting of only two sub-races.

FIG. 5 shows a bearing system corresponding to FIG. 1 in which however originally the rolling elements 4, 5, 6 between centre race 1 and inner race 3 are loaded. The inner race 3 is then made divided and consists of the sub-races 28, 29. The conversion after wearing of an originally loaded roller row 4, 5, 6 is carried out as described with reference to FIG. 1 and illustrated in FIG. 6. Similar to FIGS. 5 and 6 a bearing according to FIG. 3 with undivided centre race can also be secured firstly with the inner race 3 to the second component 13.

In the embodiments of FIGS. 1, 2, 5, 6 the actual connecting screws 12 connecting the second component 13 to the outer race 2 and inner race 3 respectively may remain firmly tightened during the conversion operations. They can be released only after the conversion has been completed and the screws 17 which connect the inner race 3 or outer race 2 then connected to the second component 13 are tightened. This excludes any tilting of the second component 13 during the conversion time due to temporary partial loosening of screws.

Figure 7:
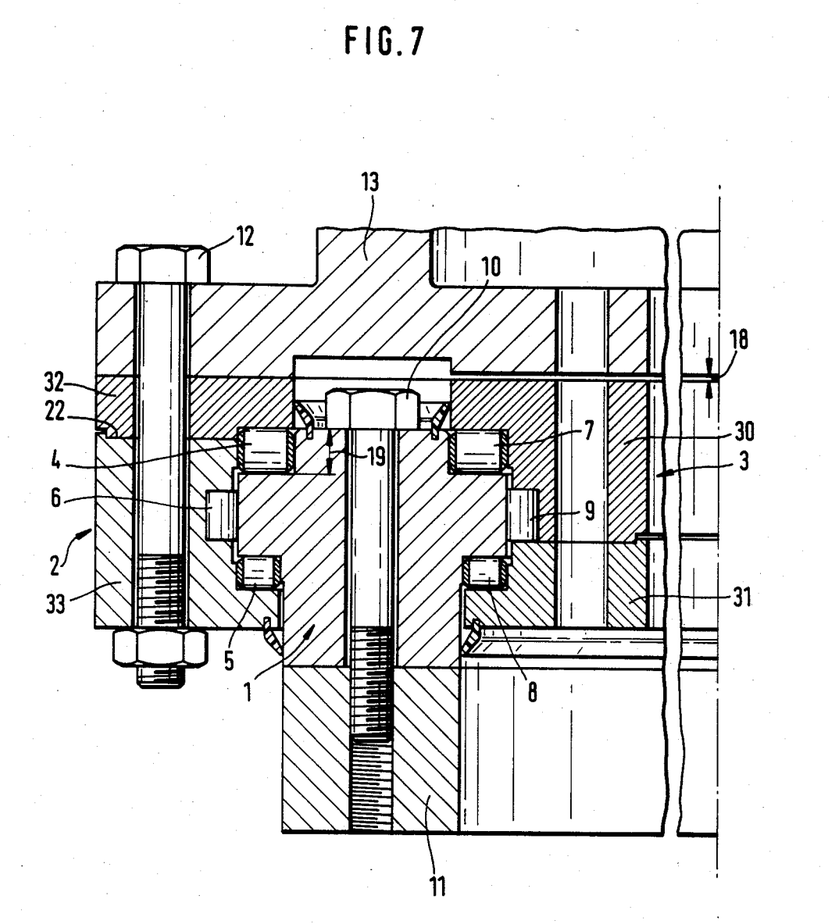

FIG. 7 shows a bearing form corresponding to FIG. 3 with divided outer race 2 and divided inner race 3. In this case however the outer race is divided only into two sub-races 32, 33. The parting line 22 again lies at the level of the roller row 4 bearing the supported load. This constructional form is not as complicated as the constructional form of FIG. 3. To remove the holding roller row 5 and radial roller row 6, however, the sub-race 33 must be lowered to a great extent.

Figure 8:
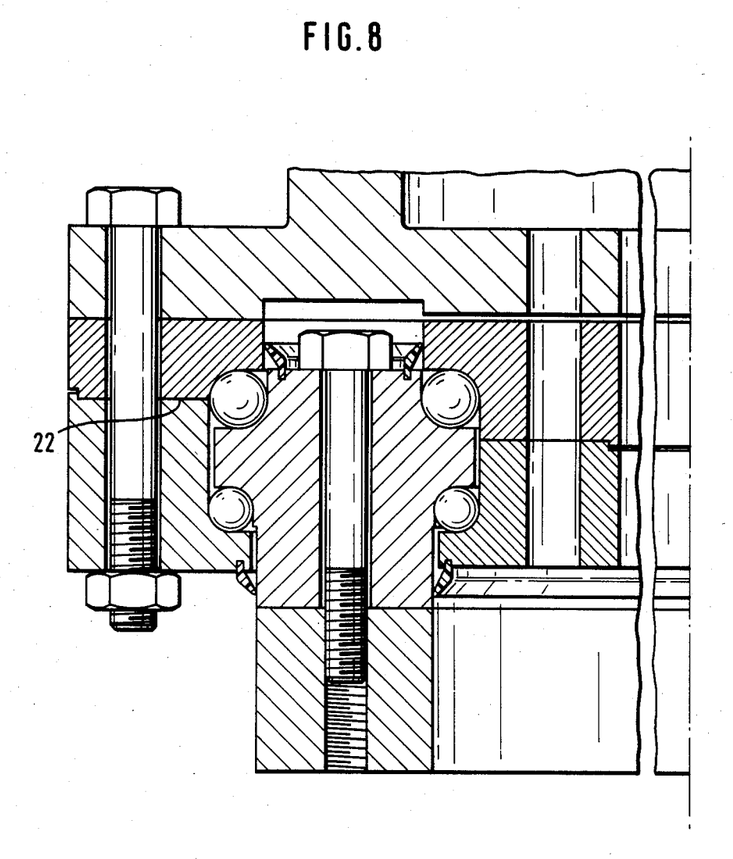
FIG. 8 is a large rolling bearing corresponding to FIG. 7 with balls as rolling elements.

The invention is not restricted to double three-row roller bearings. Other rolling bearing constructional forms are possible, for example double two-row ball bearings can be constructed according to the invention (FIG. 8).

I claim:

1. A centre-free large rolling bearing in double constructional form having three bearing races (1, 2, 3), two of which are rotatable independently of each other and with respect to the third, and arranged therebetween rolling element rows (4, 5, 6, 7, 8, 9) for rotational connection of two components (11, 13), a centre race (1) being fixedly connectable to a first component (11) and an outer race (2) or an inner race (3) being fixedly connectable to a second component (13), characterized in that the centre race (1) consists of a plurality of sub-races (15, 16), that the outer race (2) connected to the second component (13) likewise consists of a plurality of sub-races (20, 21) and a parting line (22) of said outer race is disposed substantially at the same level as the rolling element row (4), bearing the supported load, of said outer race, and that the inner race (3) not connected to the second component (13) has a spacing (18) from the component (13) which is less than the height (19) of the rolling element row (4), bearing the supported load, of the connected outer race (2).

2. The large rolling bearing according to claim 1, characterized in that with an integrally formed centre race (1) the inner race (3) and the outer race (2) are formed by a plurality of sub-races (23, 24, 25, 26, 27) and a parting line (22) of the outer race (2) connected to the second component (13) is disposed substantially at the same level as the rolling element row (4), bearing the supported load, of said outer race, and that the inner race (3) not connected to the second component (13) has a spacing (18) from the component (13) which is less than the height (19) of the rolling element row (4), bearing the supported load, of the connected outer race (2).

3. The large rolling bearing according to claim 2, characterized in that after wear of at least one rolling element row (4, 5, 6) between the centre race (1) and the outer race (2) fixedly connected to the second component (13) the rolling element row (4), bearing the supported load, after loosening and removal of the sub-race (21, 24, 29) disposed at the level of said rolling bearing row is removed and that the second component (13) after lowering onto the hitherto not fixedly connected inner race (3) is fixedly connected to the latter.

4. The large rolling bearing according to claim 2, characterized in that instead of an outer race at first an inner race (3) is connected to the second component (13) and comprises the parting line (22).

5. The large rolling bearing according to claim 1 characterized in that after wear of at least one rolling element row (4, 5, 6) between the centre race (1) and the outer race (2) fixedly connected to the second component (13) the rolling element row (4), bearing the supported load, after loosening and removal of the sub-race (21, 24, 29) disposed at the level of said rolling bearing row is removed and that the second component (13) after lowering onto the hitherto not fixedly connected inner race (3) is fixedly connected to the latter.

6. The large rolling bearing according to claim 5, characterized in that instead of an outer race at first an inner race (3) is connected to the second component (13) and comprises the parting line (22).

7. The large rolling bearing according to claim 1 or characterized in that instead of an outer race at first an inner race (3) is connected to the second component (13) and comprises the parting line (22).

* * * * *